(12) United States Patent
Schipp et al.

(10) Patent No.: US 10,837,461 B2
(45) Date of Patent: Nov. 17, 2020

(54) VIBRATION ISOLATING MOUNTING OF FAN

(71) Applicant: Haier US Appliance Solutions, Inc., Wilmington, DE (US)

(72) Inventors: Mark Alan Schipp, Louisville, KY (US); Martin Mitchell Zentner, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 83 days.

(21) Appl. No.: 16/379,871

(22) Filed: Apr. 10, 2019

(65) Prior Publication Data

US 2020/0325913 A1 Oct. 15, 2020

(51) Int. Cl.
| | | |
|---|---|---|
| F04D 29/66 | (2006.01) |
| F16F 1/373 | (2006.01) |
| F16F 1/377 | (2006.01) |
| F25D 17/06 | (2006.01) |
| F16F 15/00 | (2006.01) |

(52) U.S. Cl.
CPC ............ *F04D 29/668* (2013.01); *F16F 1/377* (2013.01); *F16F 1/3732* (2013.01); *F16F 15/00* (2013.01); *F25D 17/067* (2013.01); *F05D 2260/96* (2013.01); *F16F 2224/025* (2013.01); *F25D 2317/0681* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,568,243 A | * | 2/1986 | Schubert | F04D 29/023 248/570 |
| 4,598,894 A | * | 7/1986 | Johannes | F16F 1/373 248/615 |
| 4,807,718 A | * | 2/1989 | Lotz | F04D 29/668 181/202 |
| 5,042,269 A | * | 8/1991 | Sullivan | F04D 25/16 62/285 |
| 5,533,704 A | * | 7/1996 | Fischinger | F04D 29/668 248/603 |
| 5,833,436 A | * | 11/1998 | Ho | F04D 29/601 416/247 R |
| 6,351,380 B1 | * | 2/2002 | Curlee | F16B 5/065 165/80.3 |

(Continued)

FOREIGN PATENT DOCUMENTS

| | | | | |
|---|---|---|---|---|
| CN | 202092246 U | | 12/2011 | |
| DE | 10330076 A1 | * | 1/2005 | ......... H05K 7/20172 |

(Continued)

*Primary Examiner* — David E Sosnowski
*Assistant Examiner* — Wayne A Lambert
(74) *Attorney, Agent, or Firm* — Dority & Manning, P.A.

(57) ABSTRACT

A fan assembly for isolating the vibration of a fan within an appliance is provided herein. The fan assembly may include an elastomeric band between the fan and a mount for an air distribution channel, preventing contact between the components and the accompanying direct translation of the fan's vibration. The elastomeric band may include first and second slots which accommodate retaining members or other elements of the fan and the mount, the slots being separated from one another so as to prevent contact of the fan and mount.

20 Claims, 9 Drawing Sheets

(56) References Cited

U.S. PATENT DOCUMENTS

| | | | | |
|---|---|---|---|---|
| 6,584,799 B2* | 7/2003 | Jung | ............... | F04D 29/384 |
| | | | | 416/228 |
| 7,186,075 B2* | 3/2007 | Winkler | ............... | F04D 25/12 |
| | | | | 415/119 |
| 7,189,053 B2* | 3/2007 | Winkler | ............... | B29C 45/0062 |
| | | | | 415/108 |
| 7,312,991 B2* | 12/2007 | Lee | ............... | F04D 29/668 |
| | | | | 361/695 |
| 7,317,267 B2* | 1/2008 | Schmid | ............... | F04D 29/601 |
| | | | | 248/603 |
| 9,938,989 B2* | 4/2018 | Vardar | ............... | F04D 29/522 |
| 10,012,241 B2* | 7/2018 | Mutlu Bozay | ............... | G06F 1/20 |
| 10,254,037 B2* | 4/2019 | Candeo | ............... | F25D 17/062 |
| 2005/0278927 A1* | 12/2005 | Campbell | ............... | F04D 29/601 |
| | | | | 29/453 |
| 2010/0158671 A1* | 6/2010 | Lin | ............... | F04D 25/0613 |
| | | | | 415/119 |
| 2012/0114499 A1* | 5/2012 | Lu | ............... | F04D 19/007 |
| | | | | 416/244 R |
| 2017/0276421 A1 | 9/2017 | Candeo et al. | | |

FOREIGN PATENT DOCUMENTS

| | | | | |
|---|---|---|---|---|
| DE | 102009027881 A1 * | 1/2011 | ............... | F16F 1/376 |
| EP | 1477346 A2 * | 11/2004 | ............... | F04D 29/668 |
| JP | 5521648 B2 | 6/2014 | | |
| WO | WO-2014202142 A1 * | 12/2014 | ............... | F04D 29/64 |

* cited by examiner

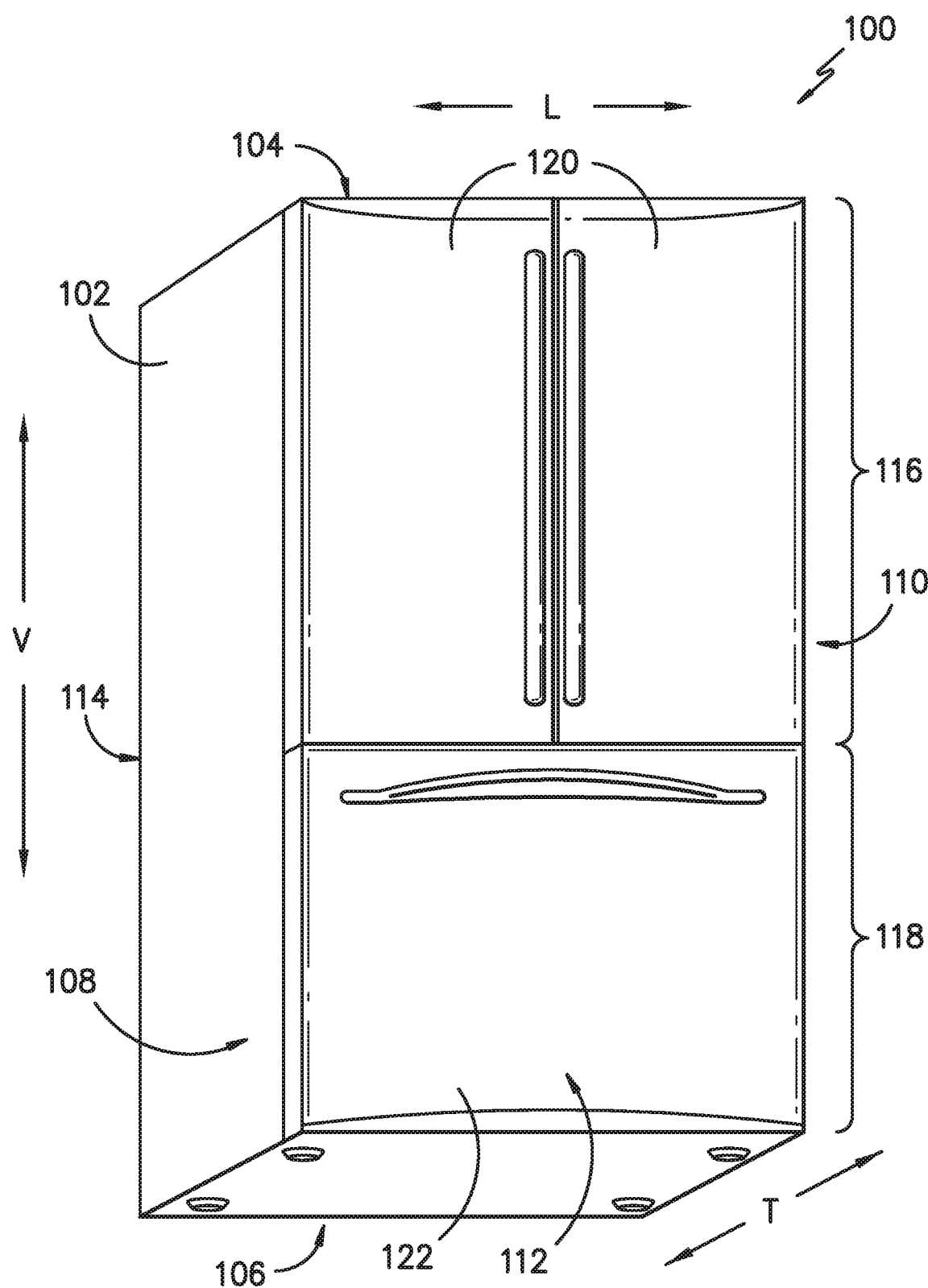
FIG. -1-

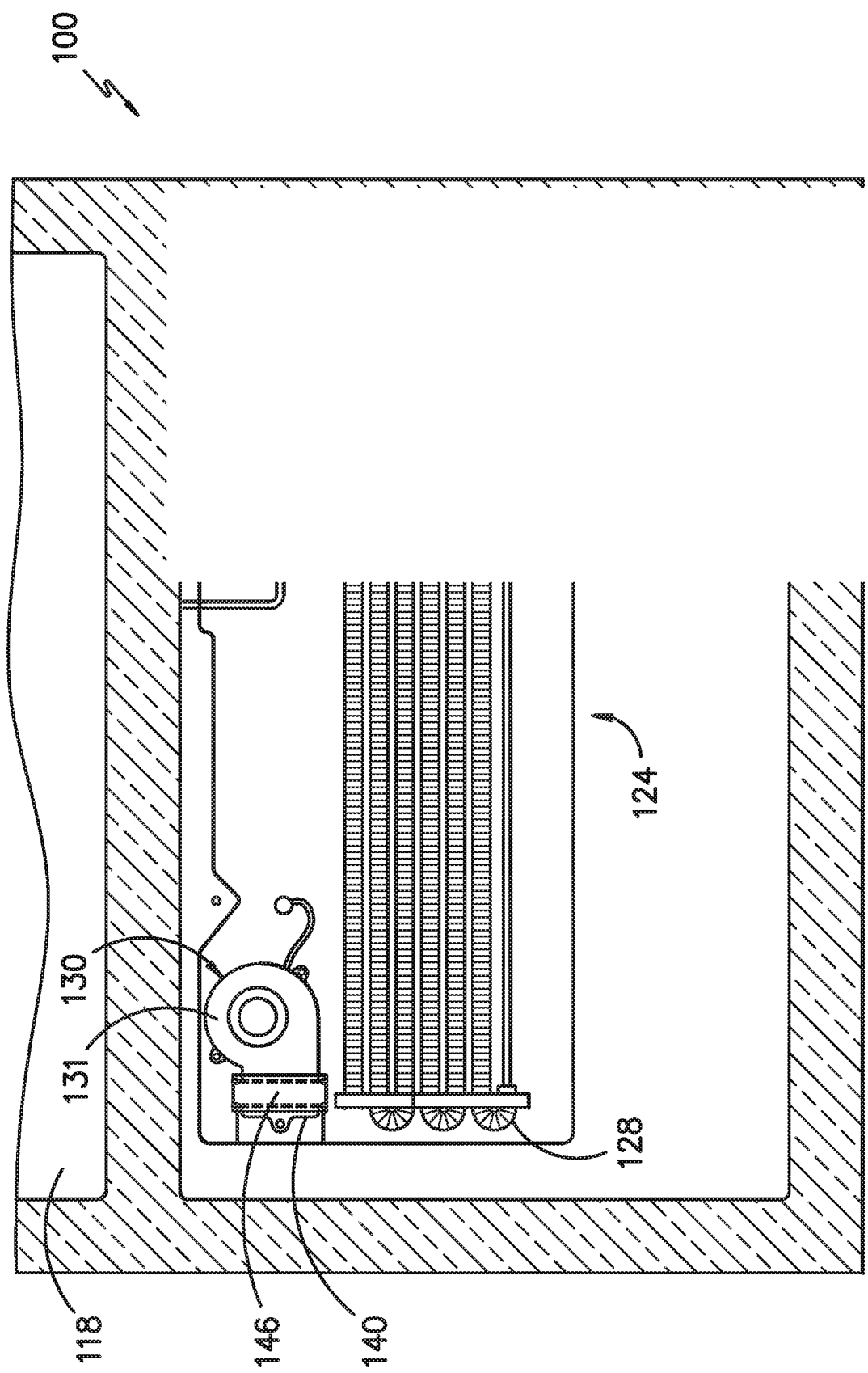

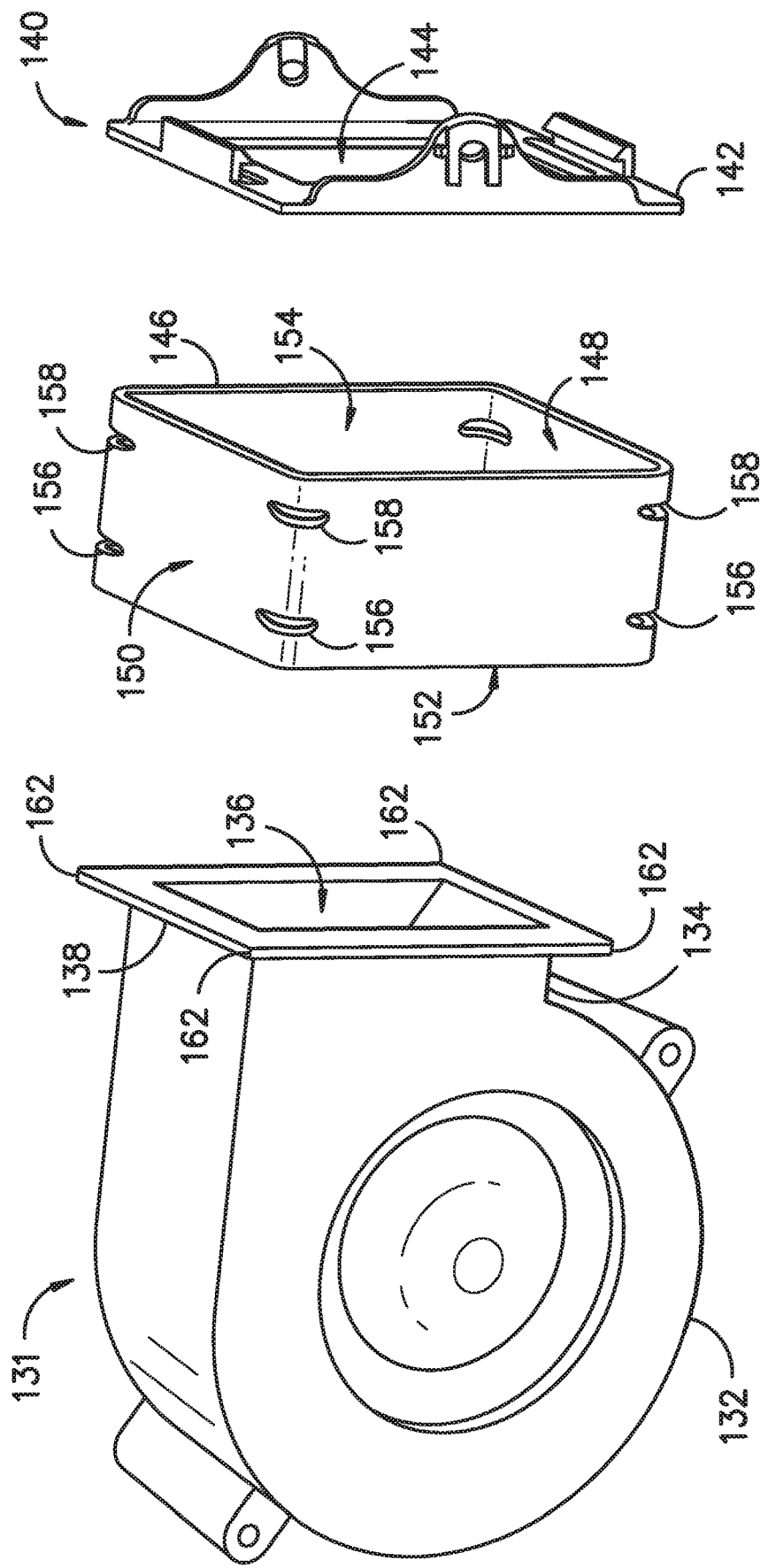
FIG. -3A-

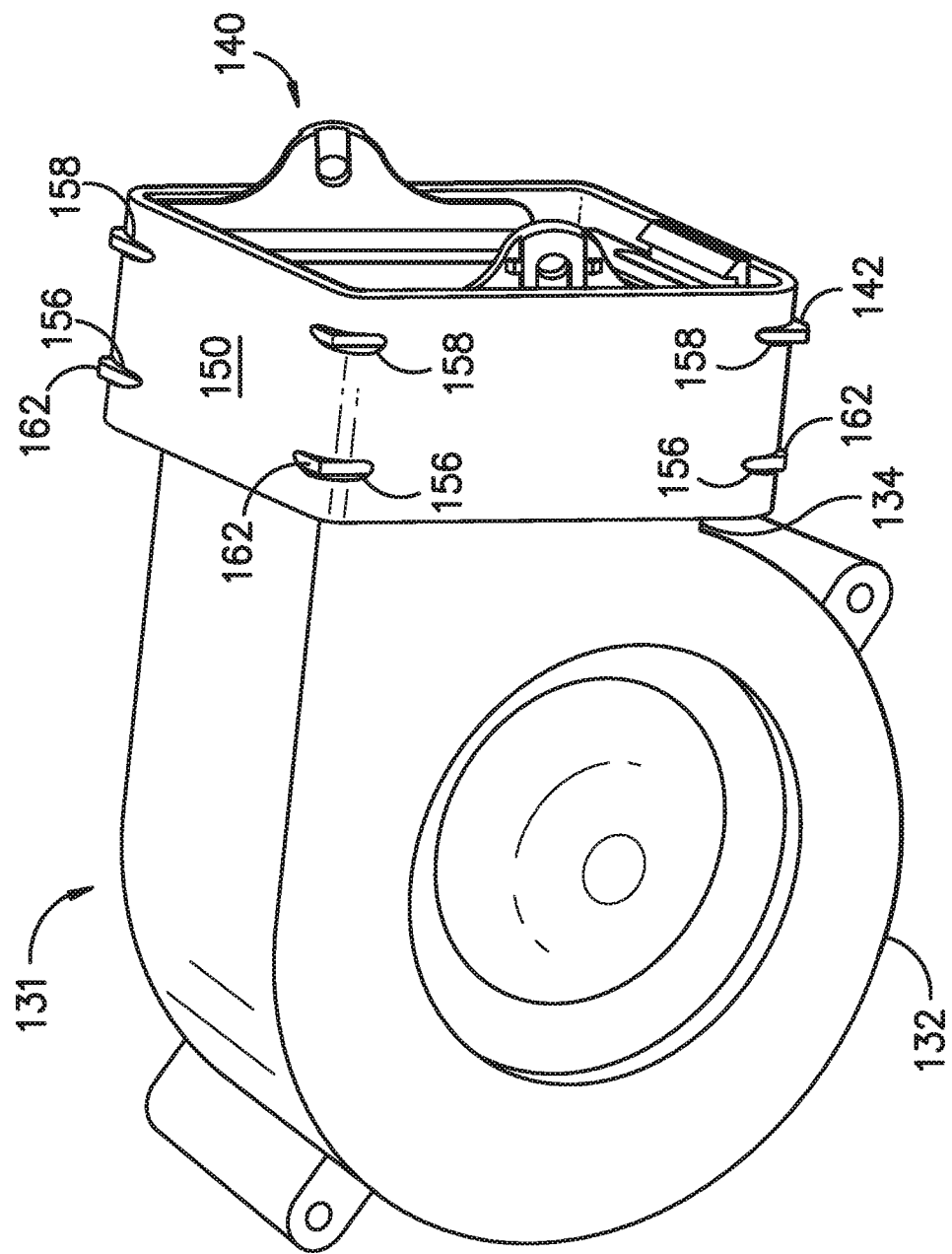
FIG. -3B-

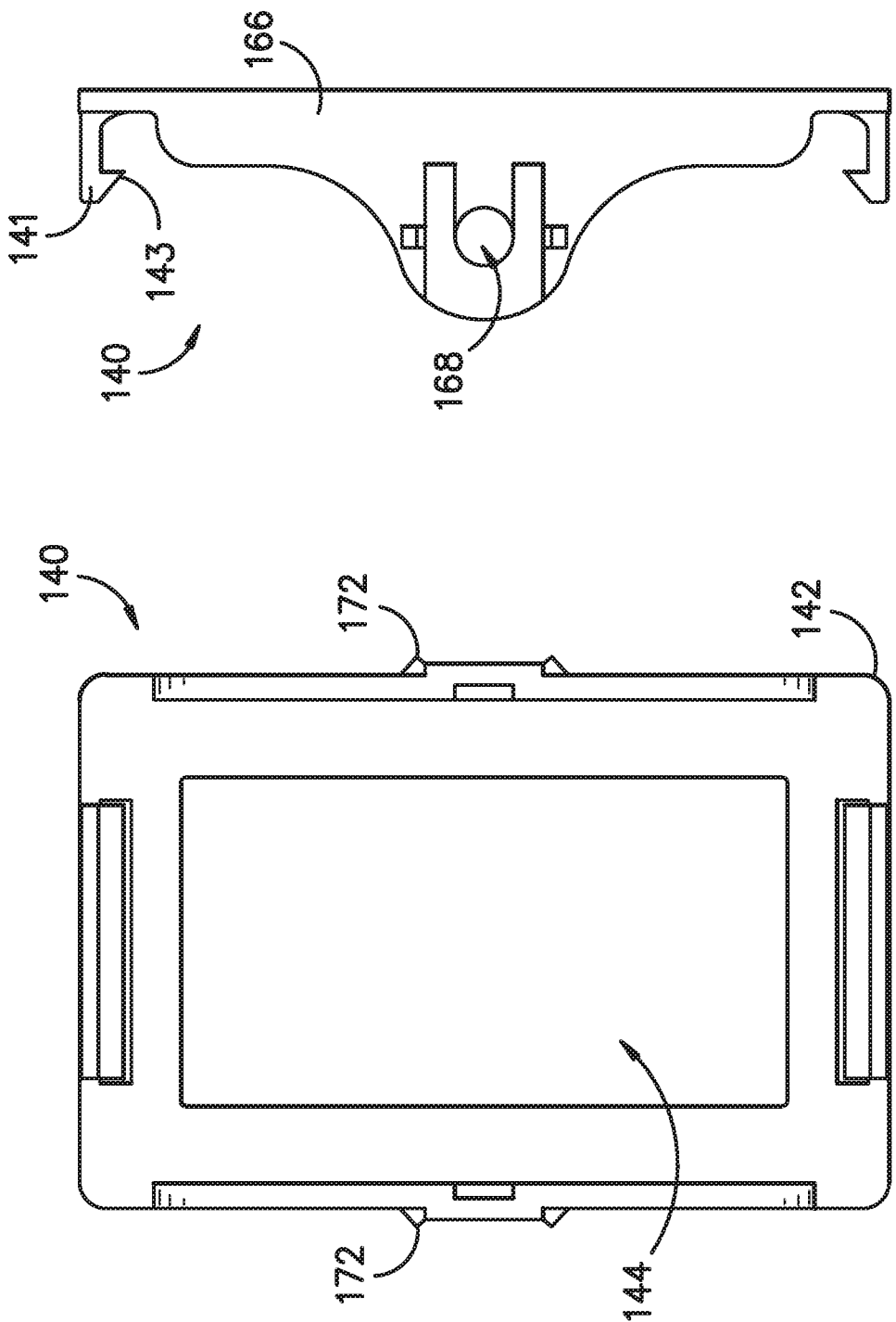

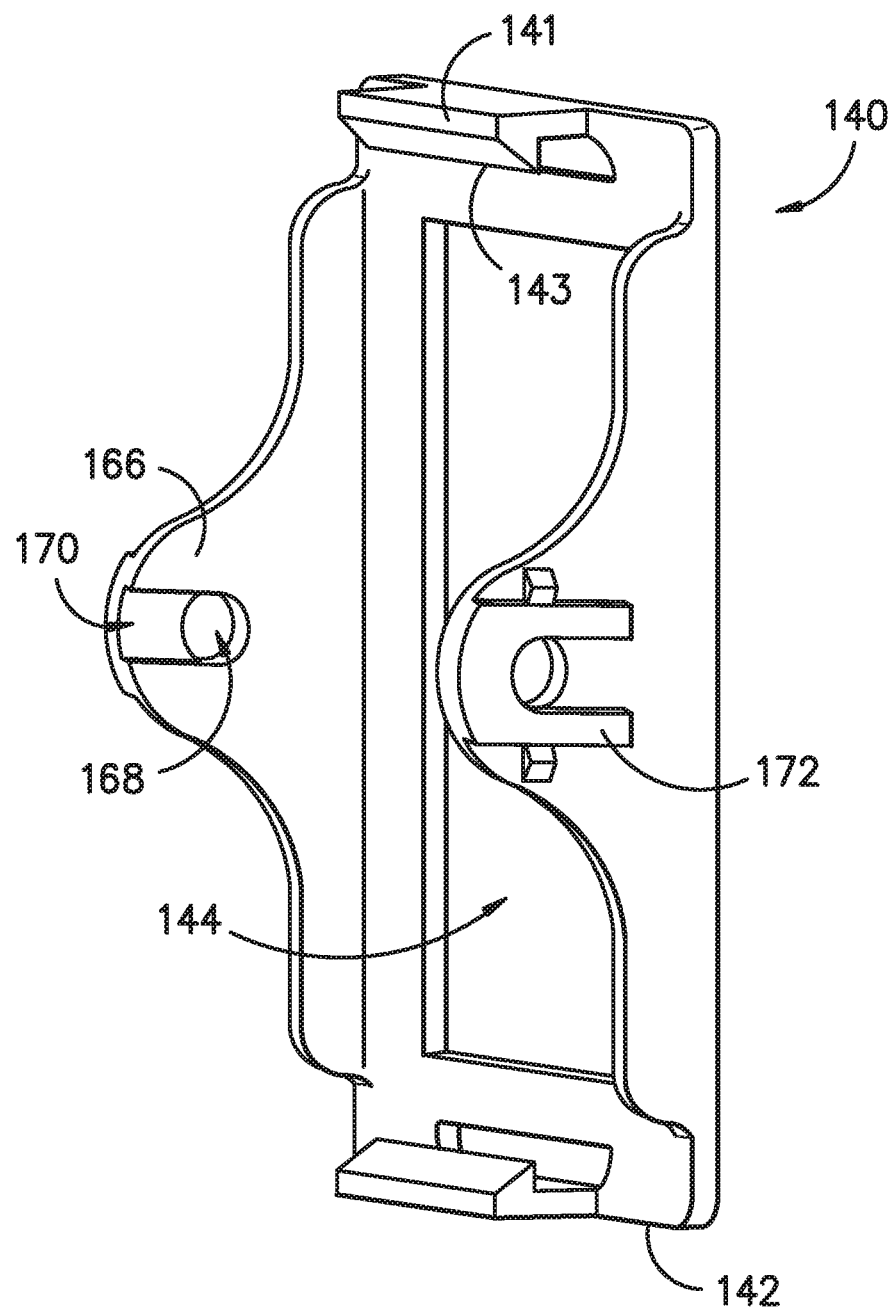
FIG. -6-

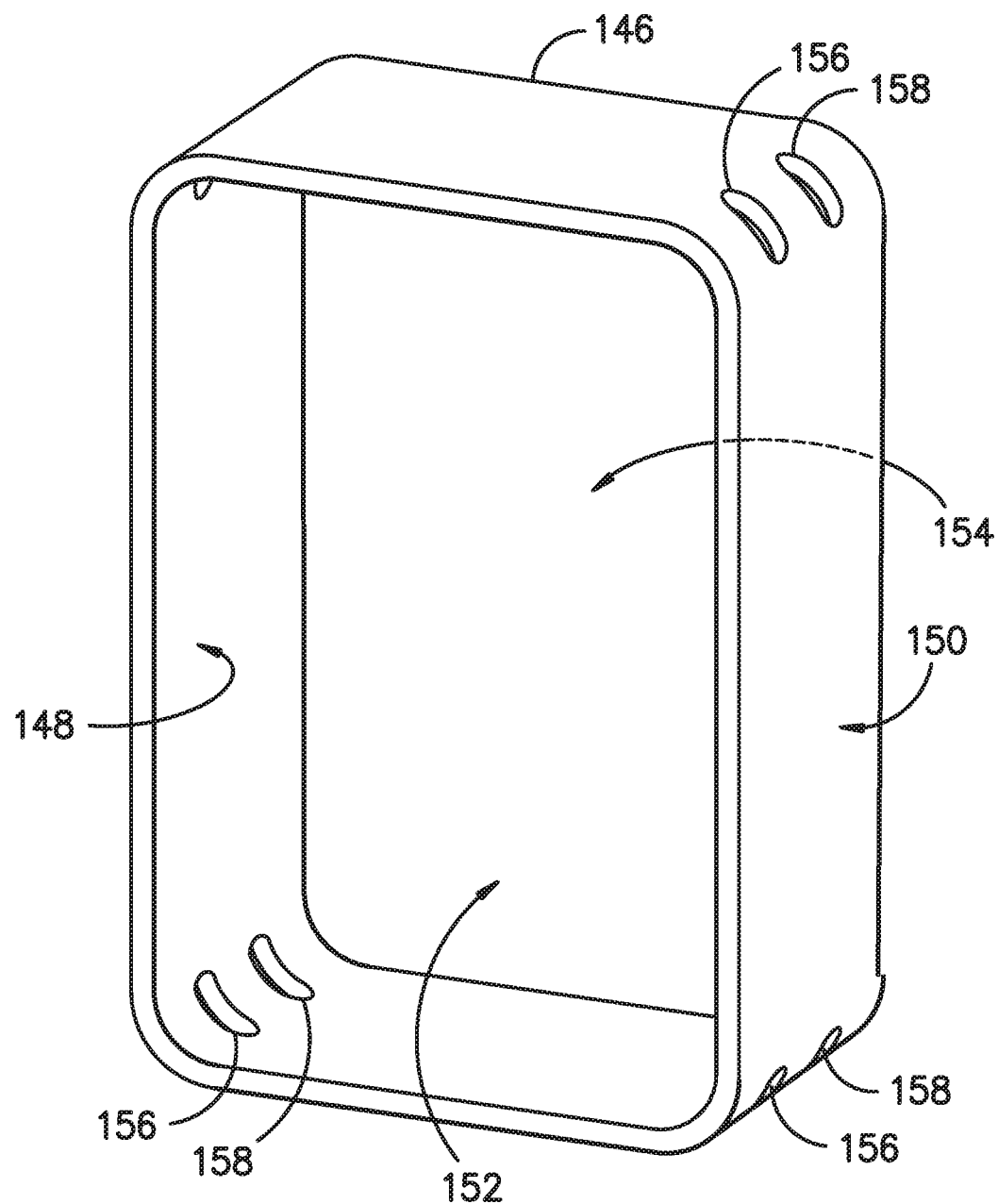
FIG. -7-

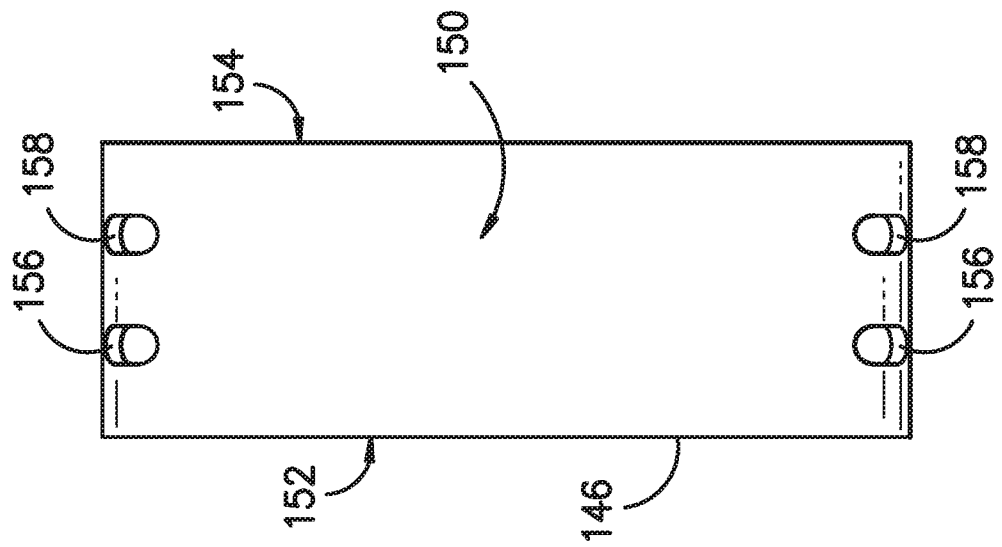
FIG. -9-
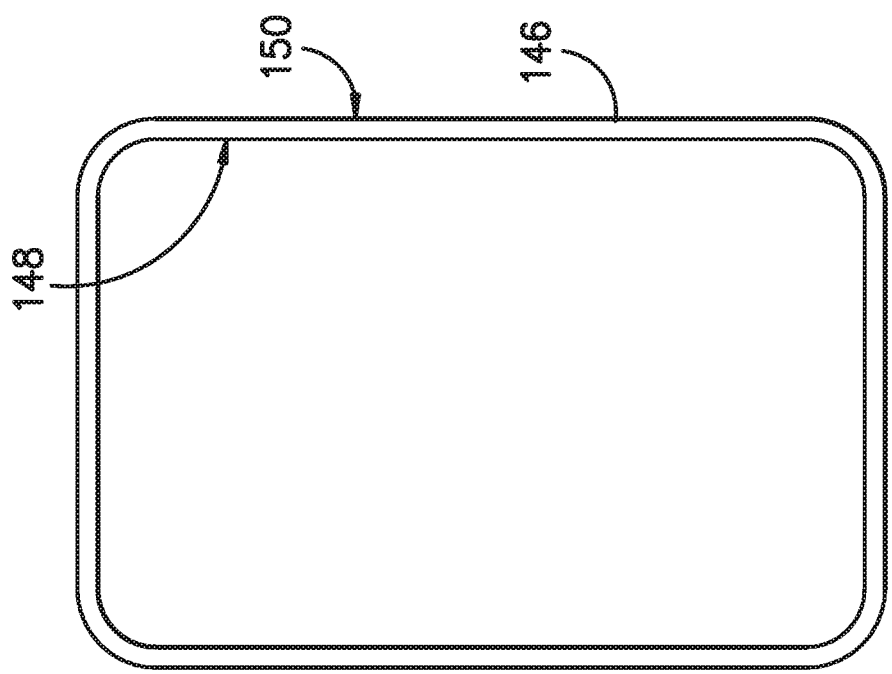
FIG. -8-

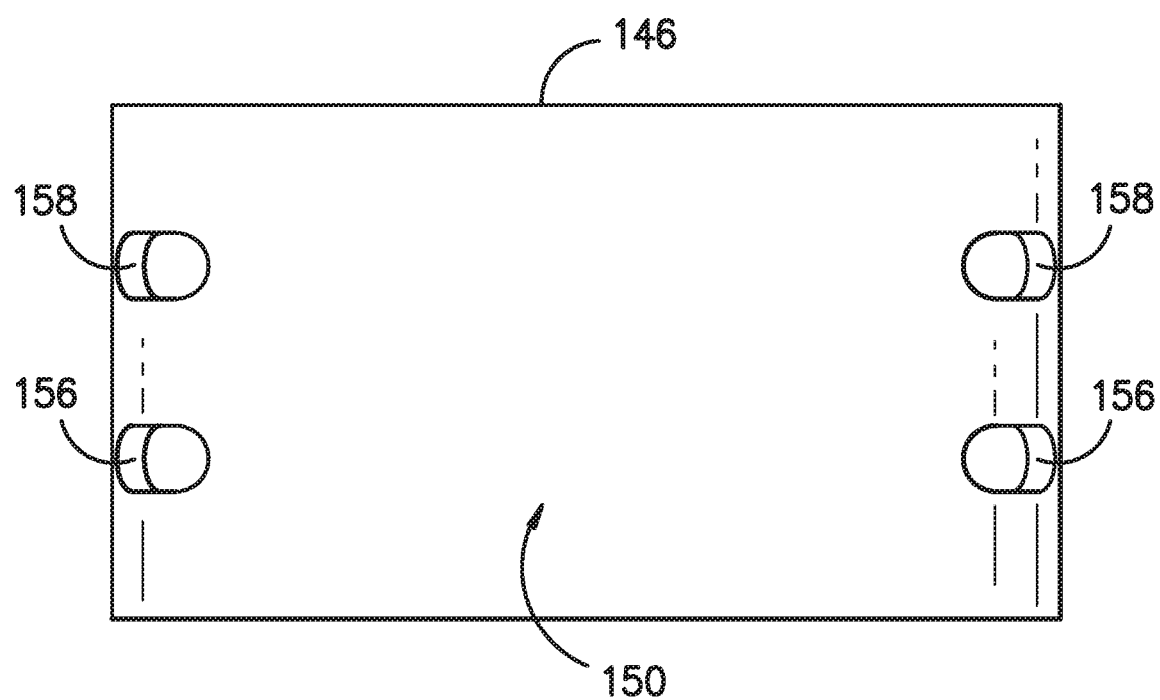
FIG. -10-

VIBRATION ISOLATING MOUNTING OF FAN

FIELD OF THE INVENTION

The present subject matter generally relates to a fan assembly for an appliance and, more particularly, to vibration dampening and support apparatus for mounting a fan within an appliance.

BACKGROUND OF THE INVENTION

Various household appliances utilize fans to circulate air within the appliance for purposes including heating, cooling, drying and the like. The fan is generally mounted to the appliance frame. Further, the air outlet of the fan is generally connected to an air duct or other air distribution channel within the appliance.

When the fan is in operation, the forces generated cause the fan to vibrate. These vibrations are then translated through the fan connections to the appliance frame and air duct, causing those elements to vibrate as well. The cumulative vibration of all of these components results in an undesirable amount of noise, which many consumers find aggravating.

Accordingly, an assembly to mount the fan within the appliance which absorbs the vibration of the fan and supports the fan itself is desirable.

BRIEF DESCRIPTION OF THE INVENTION

Aspects and advantages of the invention will be set forth in part in the following description, or may be obvious from the description, or may be learned through practice of the invention.

In exemplary aspects of the present disclosure, a fan assembly is provided. The fan assembly may include a fan, an elastomeric band, and a mount. The fan may distribute air through an air flow path of the appliance. The fan may further include housing and at least one fan retaining member. The housing may include a housing outlet, wherein the housing outlet forms a first opening through which air is discharged from the fan. The at least one fan retaining member may be connected to the housing outlet, wherein the at least one fan retaining member extends away from the first opening. The mount may include a frame forming a second opening which receives air discharged from the fan. The elastomeric band may include an interior surface, an exterior surface, an air inlet end, an air outlet end, at least one first slot, and at least one second slot. Each first slot may form an opening between the interior surface and the exterior surface of the elastomeric band. Each at least one second slot may form an opening between the interior surface and the exterior surface of the elastomeric band. Each second slot may be located between each first slot and air outlet end. The air outlet end of the elastomeric band may extend around at least a portion of the housing outlet and the air outlet end of the elastomeric band may extend around at least a portion of the mount. At least a portion of each fan retaining member may extend through at least one first slot and at least a portion of the frame may extend through at least one second slot, such that the elastomeric band support the fan and prevents contact between the housing outlet and the mount.

In other exemplary aspects of the present disclosure, a refrigerator application is provided. The refrigerator appliance may include a cabinet, an insulated chamber within the cabinet, an evaporator, and a fan assembly. The fan assembly may include a fan, an elastomeric band, and a mount. The fan may distribute air through an air flow path of the appliance. The fan may further include a housing and at least one fan retaining member. The housing may include a housing outlet, wherein the housing outlet forms a first opening through which air is discharged from the fan. The at least one fan retaining member may be connected to the housing outlet, wherein the at least one fan retaining member extends away from the first opening. The mount may include a frame forming a second opening which receives air discharged from the fan. The elastomeric band may include an interior surface, an exterior surface, an air inlet end, an air outlet end, at least one first slot, and at least one second slot. Each first slot may form an opening between the interior surface and the exterior surface of the elastomeric band. Each at least one second slot may form an opening between the interior surface and the exterior surface of the elastomeric band. Each second slot may be located between each first slot and air outlet end. The air outlet end of the elastomeric band may extend around at least a portion of the housing outlet and the air outlet end of the elastomeric band may extend around at least a portion of the mount. At least a portion of each fan retaining member may extend through at least one first slot and at least a portion of the frame may extend through at least one second slot, such that the elastomeric band support the fan and prevents contact between the housing outlet and the mount.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a refrigerator appliance according to an exemplary embodiment of the present disclosure.

FIG. 2 provides a cross-sectional view of the bottom of an exemplary refrigerator appliance.

FIG. 3A provides an exploded view of the components of an unassembled fan assembly in accordance with the present disclosure.

FIG. 3B provides a perspective view of the components of an assembly fan assembly in accordance with the present disclosure.

FIG. 4 provides a front view of an exemplary embodiment of a mount in accordance with the present disclosure.

FIG. 5 provides a side view of an exemplary embodiment of a mount in accordance with the present disclosure.

FIG. 6 provides a perspective view of an exemplary embodiment of a mount in accordance with the present disclosure.

FIG. 7 provides a perspective view of an exemplary embodiment of an elastomeric band in accordance with the present disclosure.

FIG. 8 provides a front view of an exemplary embodiment of an elastomeric band in accordance with the present disclosure.

FIG. 9 provides a side view of an exemplary embodiment of an elastomeric band in accordance with the present disclosure.

FIG. 10 provides a top view of an exemplary embodiment of an elastomeric band in accordance with the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning to the figures, FIG. 1 illustrates a perspective view of an exemplary appliance (e.g., a refrigerator appliance 100). Although the fan mounting assembly described herein is explained in the context of an exemplary refrigerator appliance, it is to be understood that the fan mounting assembly may be employed in any appliance utilizing a fan, such as, for example, a dryer, freezer, air conditioner, heater, electric fireplace, or the like.

Refrigerator appliance 100 includes a cabinet 102. As shown, cabinet 102 generally extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

As shown, cabinet 102 generally defines one or more insulated chambers for receipt of food items for storage. In particular, cabinet 102 defines a fresh food chamber 116 proximal to top 104 of cabinet 102 and a freezer chamber 118 arranged proximal to bottom 106 of cabinet 102. Freezer chamber 118 is spaced apart from fresh food chamber 116 along the vertical direction V. It is recognized, however, that the benefits of the present disclosure apply to other types and styles of refrigerator appliances. Consequently, the description set forth herein is for illustrative purposes only and is not intended to be limiting in any aspect to any particular appliance configuration.

According to the illustrated embodiment, various storage components are mounted within fresh food chamber 116 to facilitate storage of food items therein as will be understood by those skilled in the art. In particular, the storage components include bins, drawers, and shelves (not pictured) that are mounted within fresh food chamber 116. Bins, drawers, and shelves are positioned to receive of food items (e.g., beverages, solid food items, etc.) and may assist with organizing such food items. As an example, drawers can receive fresh food items (e.g., vegetables, fruits, or cheeses) and increase the useful life of such fresh food items.

One or more refrigerator doors 120 are rotatably hinged to an edge of cabinet 102 for selectively accessing insulated fresh food chamber 116 and extending across at least a portion of fresh food chamber 116. In addition, a freezer door 122 is rotatably hinged below refrigerator doors 120 for selectively accessing insulated freezer chamber 118 and extending across at least a portion of freezer chamber 118. Refrigerator doors 120 and freezer door 122 are each shown in the closed position in FIG. 1 (i.e., a first closed position corresponding to doors 120, and a second closed position corresponding to door 122).

Operation of the refrigerator appliance 100 can be generally controlled or regulated by a controller (not shown). In some embodiments, the controller is operably coupled to a user interface panel (e.g., mounted within fresh food chamber 116) or various other components of refrigerator appliance 100. In some embodiments, the user interface panel provides selections for user manipulation of the operation of refrigerator appliance 100. As an example, the user interface panel may provide for selections of temperature settings or specific modes of operation. In response to one or more input signals (e.g., from user manipulation of the user interface panel or one or more sensor signals), the controller may operate various components of the refrigerator appliance 100 according to the current mode of operation.

The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes programming instructions stored in memory. For certain embodiments, the instructions include a software package configured to operate appliance 100. The memory may be a separate component from the processor or may be included onboard within the processor. Alternatively, the controller may be constructed without using a microprocessor (e.g., using a combination of discrete analog or digital logic circuitry—such as switches, amplifiers, integrators, comparators, flip-flops, AND gates, and the like) to perform control functionality instead of relying upon software.

The controller, or portions thereof, may be positioned in a variety of locations throughout refrigerator appliance 100. In example embodiments, the controller is located within the user interface panel. In other embodiments, the controller may be positioned at any suitable location within refrigerator appliance 100, such as for example within cabinet 102, doors 120 or 122, etc. Input/output ("I/O") signals may be routed between the controller and various operational components of refrigerator appliance 100. For example, the user interface panel may be operably coupled to the controller via one or more signal lines or shared communication busses.

Turning to FIG. 2, a cut away view of certain components of a sealed cooling system 124 for refrigerator appliance 100 is provided. As may be seen in FIG. 2, refrigerator appliance 100 includes a sealed cooling system 124 for executing a vapor compression cycle for cooling air within refrigerator appliance 100 (e.g., within fresh food chamber 116 and freezer chamber 118). Sealed cooling system 124 includes a compressor, a condenser, an expansion device (not shown), and an evaporator 128 connected in fluid series and charged with a refrigerant. As will be understood by those skilled in the art, sealed cooling system 124 may include additional or fewer components. For example, sealed cooling system 124 may include multiple discrete evaporators positioned in separate locations within cabinet 102.

Within sealed cooling system 124, gaseous refrigerant flows into the compressor, which operates to increase the pressure of the refrigerant. This compression of the refrigerant raises its temperature, which is lowered by passing the gaseous refrigerant through the condenser. Within the condenser, heat exchange (e.g., with ambient air) takes place so as to cool the refrigerant and cause the refrigerant to condense to a liquid state.

The expansion device (e.g., a valve, capillary tube, or other restriction device) receives liquid refrigerant from the condenser. From the expansion device, the liquid refrigerant enters evaporator 128. In some embodiments, such as the embodiment of FIG. 2, evaporator 128 is positioned within freezer chamber 118. Upon exiting the expansion device and entering evaporator 128, the liquid refrigerant drops in pressure and vaporizes. Due to the pressure drop and phase change of the refrigerant, evaporator 128 is cool relative to freezer and fresh food chambers 118 and 116 of refrigerator appliance 100. As such, cooled air is produced and refrigerates freezer and fresh food chambers 118 and 116 of refrigerator appliance 100. Thus, evaporator 128 acts as a heat exchanger that transfers heat from air passing over evaporator 128 to refrigerant flowing through evaporator 128. In some embodiments, a fan assembly 130 is provided adjacent to evaporator 128. For instance, fan assembly 130 may be provided within freezer chamber 118 to motivate air across evaporator 128 and into the freezer and fresh food chambers 118 and 116 in a forced convection airflow. Additionally or alternatively, air may flow between freezer and chamber 118 and fresh food chamber 116 via a natural convection airflow (i.e., according to the difference in density between relatively cold air and relatively hot air). In other embodiments, fan assembly 130 may be dedicated to a particular application, such as cooling of an ice box (not pictured). In such embodiments, fan assembly 130 may be situated in proximity to evaporator 128 in order to draw cooled air created by operation of evaporator 128. However, unlike most fans employed in a closed cooling system of a refrigerator, operation of fan assembly 130, in this embodiment, may be operated independently of evaporator 128. That is, this embodiment of fan assembly 130 may be turned on to provide cooling air to the ice box while evaporator 128 remains idle. Likewise, heat exchange through operation of evaporator 128 may occur without running fan assembly 130 in this embodiment.

Although refrigerators, and many appliances on the market, employ a fan to circulate air, the fan is commonly connected to directly or indirectly to the appliance frame. Additionally, the fans of these appliances are often further connected to the appliance at the fan outlet, which typically attaches to the inlet of an air duct or other air distribution channel using physical (e.g., screws, nuts and bolts, rivets) or adhesive methods of connection. Because the fan is physically restrained in such situations, operation of the fan results in significant vibration, which is then translated through the mounting and fan outlet connections to other components of the appliance. Each of these sources of vibration results in noise, the cumulative effect being a frequent source of complaints from consumers.

Fan assembly 130, an embodiment of which is shown in the exploded view of FIG. 3A and the assembled view of FIG. 3B, addresses this problem by eliminating the need for direct contact between the fan and the appliance and providing a vibration-isolating buffer between the fan and appliance where necessary. In particular, fan assembly 130 includes fan 131 and mount 140 connected via elastomeric band 146. Mount 140, in turn, may be connected or integral to an air distribution channel for circulating air within appliance 100. Once connected, elastomeric band 146 supports fan 131, eliminating the need for a direct connection between fan 131 and appliance 100 for the purpose of mounting. Further, elastomeric band 146 enables fluid communication between fan 131 and mount 140 (and therefore to the air distribution channel) while preventing direct contact between the two, permitting elastomeric band 146 to absorb a large portion of the energy generated by the vibration of fan 131.

Turning next to the individual components of fan assembly 130, FIGS. 3A and 3B depict an embodiment of fan 131. It should be appreciated that fan 131 may be any suitable type, size, and configuration for circulating air through the system. For example, fan 131 could be an axial fan, or each fresh food and freezer chamber 116 and 118 could have a dedicated fan for urging cooling airflow into the respective chambers. Fan 131 may include a housing 132 forming the exterior of fan 131 and providing protection for its internal components. Housing 132 may further include a housing outlet 134 constituting the portion of housing 132 that guides air flow generated by fan 131 out of fan 131. Housing outlet 134 is shaped such that it forms a first opening 136 through which air flow is discharged from fan 131.

In certain embodiments, at least one fan retaining member 138 is connected to housing outlet 134. Each of the one or more fan retaining members 138 extends away from first opening 136 and at least partially in a direction that is parallel to the plane of first opening 136. In other words, in some embodiments, one or more fan retaining members 138 may be parallel to first opening 136, whereas in other embodiments, one or more fan retaining members 138 may extend away from first opening 136 at angle, so long as the angle is not perpendicular to the plane of first opening 136. As shown in FIGS. 3A and 3B, in some embodiments, fan retaining member 138 may be a rectangular flange. However, the flange may be of any desired shape or size, so long as it includes one or more flange corners 162 or other protrusions that interrupt the uniformity of its outer boundary. Flange corners 162 need not be sharp corners, but may be rounded or otherwise curved or segmented as desired.

Turning our attention now to mount 140, embodiments of which are depicted in FIGS. 3A & 3B-6. Mount 140 is used to connect fan assembly 130 to an air duct or other air distribution channel within appliance 100. Mount 140 includes a frame 142, which defines the shape of mount 140. Frame 142 further defines a second opening 144 through which the air flow discharged from fan 131 may enter. In the embodiment of FIGS. 3A & 3B-6, frame 142 is rectangular with rounded corners.

Mount 140 may be attached to an air duct or other air distribution channel in any myriad ways known to one of ordinary skill. For example, as shown in the embodiment of FIG. 6, mount 140 may include flexible clamps 141 with a lip 143 on the distal end of the clamp 141. The clamp 141 may be attached to or integrated with frame 142. The distal end of clamp 141 may flex over an air duct lip (not pictured) and, upon clearing the air duct lip, return to its original position, the lip 143 of clamp 141 preventing movement of mount 140 away from the air duct due to corresponding air duct lip.

Similarly, other embodiments of mount 140 may include arcuate flanges 166 that extend perpendicular to frame 142 in the direction of the air flow. As shown in the embodiment of FIG. 6, flanges 166 may include mount holes 168 centered along the length of flanges 166 that permit connection to an air duct. These mount holes 168 may be accompanied by recesses 170 in flanges 166 on the interior surface of flanges 166 extending between mount holes 168 and the outer edge of flanges 166 and utilized in the molding process to create holes 168, eliminating the need for a cam mechanism in the mold and lowering the cost of tooling. The exterior surface of flanges 166 may further include ridges, which provide thickness to flanges 166 for a mounting screw head to seat against (not pictured).

Alternatively, in other embodiments, frame 142 itself may include a number of holes or gaps (not pictured), through which screws, bolts, or other known methods of connection are used to directly attach mount 140 to an air duct. Further embodiments may include flanges of any number of shapes or sizes that extend perpendicular to the direction of air flow and away from second opening 144, which are attached to either or both of mount 140 and an air duct, through which the connection is made. As will be apparent to the skilled artisan, combinations of any of these methods of connection may also be employed consistent with the current invention. Indeed, in certain embodiments, mount 140 may be integral to an air duct or other air distribution channel, serving as an inlet end of that element of appliance 100 and therefore not requiring any mechanical connection.

In certain embodiments, one or more mount retaining members (not shown) may be connected to frame 142. In these embodiments, each of the one or more mount retaining members extends away from second opening 144 and at least partially in a direction that is parallel to the plane of second opening 144. In other words, in some embodiments, one or more mount retaining members may be parallel to second opening 144, whereas in other embodiments, one or more mount retaining members may extend away from second opening 144 at an angle, so long as the angle is not perpendicular to the plane of second opening 144.

Fan assembly 130 may further include an elastomeric band 146 for connecting fan 131 to mount 140. As used herein, the term elastomeric refers to flexible natural or synthetic rubber or rubber-like materials that are able to resume their original shape following removal of a deforming force. FIGS. 3A, 3B, and 7-10 show an exemplary elastomeric band made of silicone rubber. However, alternative solid, non-foam elastomeric materials, may be used including, but not limited to, EPDM, nitrile, Viton®, Neoprene®, butyl, and natural rubber, and other materials with similar properties and characteristics, as would be understood by the skilled artisan.

As shown in the embodiment of FIG. 7, elastomeric band 146 includes an interior surface 148 and an exterior surface 150 such that a pathway is formed through elastomeric band 146, allowing the passage of air. At one end of this pathway, elastomeric band 146 includes air inlet end 152. At least a portion of housing outlet 134 and each of the one or more fan retaining members 138 (e.g., the flange shown in the embodiment of FIGS. 3A and 3B) may be inserted into air inlet end 152. At the other end of the pathway through elastomeric band 146 is air outlet end 154. At least a portion of mount 140 and each of the mount retaining members 164 (if any) may be inserted into air outlet end 154.

The manner of physically combining fan 131 and mount 140 with elastomeric band 146 depends upon the geometry of these components at the point of connection. For example, in the embodiment of FIGS. 3A and 3B, elastomeric band 146 further includes four first slots 156 positioned in each of the corners of the rectangular (in cross-section) elastomeric band 146. Each of the first slots 156 is a gap in elastomeric band 146 providing an opening that extends between interior surface 148 and exterior surface 150. The positioning of first slots 156 corresponds to the position of flange corners 162 on the flange of fan 131. The relative size of the flange of fan 131 and elastomeric band 146 is such that when housing outlet 134 is inserted into air inlet end 152, at least a portion of flange corners 162 extend through first slots 156. This manner of attachment prevents movement of fan 131 relative to first slots 156.

Similarly elastomeric band 146 may include, as shown in the embodiment of FIGS. 3A and 3B, four second slots 158 positioned in each of the corners of the rectangular elastomeric band 146 for stabilizing the position of mount 140. Each of the second slots 158 is a gap in elastomeric band 146 providing an opening that extends between interior surface 148 and exterior surface 150. The positioning of second slots 158 corresponds to the position of the corners the rectangular mount 140. Additionally, each of second slots 158 is located between the one or more first slots 156 and air outlet end 154. The relative size of mount 140 and elastomeric band 146 is such that when mount 140 is inserted into air outlet end 154, at least a portion of frame 142 of mount 140 extends through second slots 158. In this way, movement of mount 140 relative to second slots 158.

Although the combination of fan 131, elastomeric band 146, and mount 140 is described above in the context of the exemplary embodiment of FIGS. 3A and 3B, one of ordinary skill will recognize that the invention is not limited to this embodiment, but rather is applicable to a wide array of embodiments in which one or more first slots 156 and one or more second slots 158 of elastomeric band 146 impede the movement of fan 131 and mount 140, respectively. As alternative exemplary embodiments, the flange of fan 131 may be, for example, triangular or octagonal or numerous additional shapes. In such cases, flange corners 162 may be fitted into the corresponding number of slots on elastomeric band 146. Further, the number of flange corners 162 and first slots 156 need not be equal. In other embodiments, fan 131 may lack a flange, but instead include one or more protrusions connected to housing outlet 134 that extend outward and away from first opening 136. For each of these protrusions, a corresponding first slot 156 may be present on elastomeric band 146 and located in a position that corresponds to the position of the protrusion on housing outlet 134. It should further be recognized that, although the disclosure generally refers to first slots 156 and second slots 158 as "slots," this term may reasonably be interpreted as any hole or gap capable of receiving portions of the housing outlet 134 and portions of mount 140.

Similarly, mount 140 is not limited to the embodiment of FIGS. 3A and 3B, in which at least portions of frame 142 extend through second slots 158, but may likewise include a mount retaining members, such as flange with flange corners or protrusions, that are connected to frame 142 and that engage with second slots 158 in the same manners that fan 131 may connect with elastomeric band 146, as explained above.

Additionally, in certain embodiments for which a cross-section of elastomeric band 146 maintains uniform dimensions along its entire length, it may be desirable that housing outlet 134 share substantially the same height, width, and shape as mount 140, as is the case in the embodiment of FIGS. 3A and 3B. This uniformity prevents the introduction of significant openings around the component with a smaller cross-sectional are, through which air flow generated by the fan might escape the system, decreasing efficiency and efficacy (e.g., if mount 140 is significantly smaller than housing outlet 134, air outlet end 154 of elastomeric band 146 may direct air flow to areas outside of second opening 144). Thus, in these embodiments, housing outlet 134 and mount 140 should be sized such that they maintain contact with interior surface 148 of elastomeric band 146 around their entire perimeters following their insertion into elastomeric band 146.

The stabilization of fan 131 and mount 140 within first slots 156 and 158 respectively prevents direct contact between these components, preventing any direct translation of vibrations generated during operation of fan 131. Moreover, as would be appreciated by those skilled in the art, the material characteristics of elastomeric band 146 provide the additional benefit of dampening indirect vibration from fan 131 through elastomeric band 146 by permitting deformation of the elastomeric band 146 and thus consuming the energy of the vibration. By virtue of its material characteristics, elastomeric band 146 then returns to its original form, essentially resetting the system. As will be further understood, the materials from which elastomeric band 146 are made, as previously described, have sufficient stiffness that elastomeric band 146 may support the weight of fan 131 once the two are joined as set forth above. As a result, it is not necessary to mount fan 131 to the frame or any other sub-component of appliance 100. Thus, use of fan assembly 130 further eliminates vibration and noise that would otherwise be translated to and through appliance 100 as a consequence of such a connection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fan assembly for an appliance, the fan assembly comprising:
    a fan for distributing air through an air flow path of the appliance, the fan including;
        a housing including a housing outlet, wherein the housing outlet forms a first opening through which air is discharged from the fan;
        at least one fan retaining member connected to the housing outlet, wherein the at least one fan retaining member extends away from the first opening;
    a mount including a frame forming a second opening which receives air discharged from the fan;
    an elastomeric band including;
        an interior surface;
        an exterior surface;
        an air inlet end;
        an air outlet end;
        at least one first slot, each first slot forming an opening between the interior surface and the exterior surface of the elastomeric band;
        at least one second slot, each second slot forming an opening between the interior surface and the exterior surface of the elastomeric band and
        wherein each second slot is located between each first slot and the air outlet end; and
    the air inlet end of the elastomeric band extending around at least a portion of the housing outlet and the air outlet end of the elastomeric band extending around at least a portion of the mount, at least a portion of each fan retaining member extending through the at least one first slot and at least a portion of the frame extending through the at least one second slot, such that the elastomeric band supports the fan and prevents contact between the housing outlet and the mount.

2. The fan assembly of claim 1, wherein the at least one fan retaining member is a flange with one or more corners.

3. The fan assembly of claim 2, wherein the number of corners of the flange equals the number of first slots of the elastomeric band.

4. The fan assembly of claim 3, wherein each corner of the flange extends through a separate first slot of the elastomeric band.

5. The fan assembly of claim 1, wherein the mount further includes at least one mount retaining member connected to the frame and extending away from the second opening.

6. The fan assembly of claim 1, wherein the frame has one or more corners, the number of corners of the frame equals the number of second slots of the elastomeric band.

7. The fan assembly of claim 6, wherein each corner of the frame extends through a separate second slot of the elastomeric band.

8. The fan assembly of claim 1, wherein a height and width of the housing outlet are substantially the same as a height and width of the mount.

9. The fan assembly of claim 1, wherein the elastomeric band is made of silicone rubber.

10. A refrigerator appliance comprising:
    a cabinet;
    an insulated chamber mounted within the cabinet;
    a fan assembly for generating a flow of air for delivery to the insulated chamber, the fan assembly including;
        a fan including;
            a housing including a housing outlet, wherein the housing outlet forms a first opening through which air is discharged from the fan;
            at least one fan retaining member connected to the housing outlet, wherein the at least one fan retaining member extends away from the first opening;
        a mount including a frame forming a second opening which receives air discharged from the fan;
        an elastomeric band including;
            an interior surface;
            an exterior surface;
            an air inlet end;
            an air outlet end;
            at least one first slot, each first slot forming an opening between the interior surface and the exterior surface of the elastomeric band;
            at least one second slot, each second slot forming an opening between the interior surface and the exterior surface of the elastomeric band and wherein each second slot is located between each first slot and the air outlet end; and
        the air inlet end of the elastomeric band extending around at least a portion of the housing outlet and the air outlet end of the elastomeric band extending around at least a portion of the mount, at least a portion of each fan retaining member extending through the at least one first slot and at least a portion of the frame extending through the at least one second slot, such that the elastomeric band supports the fan and prevents contact between the housing outlet and the mount.

11. The refrigerator appliance of claim 10, wherein the at least one fan retaining member is a flange with one or more corners.

12. The refrigerator appliance of claim 11, wherein the number of corners of the flange equals the number of first slots of the elastomeric band.

13. The refrigerator appliance of claim 12, wherein each corner of the flange extends through a separate first slot of the elastomeric band.

14. The refrigerator appliance of claim 10, wherein the mount further includes at least one mount retaining member connected to the frame and extending away from the second opening.

15. The refrigerator appliance of claim 10, wherein the frame has one or more corners, the number of corners of the frame equals the number of second slots of the elastomeric band.

16. The refrigerator appliance of claim 15, wherein each corner of the frame extends through a separate second slot of the elastomeric band.

17. The refrigerator appliance of claim 10, wherein a height and width of the housing outlet are substantially the same as a height and width of the mount.

18. The refrigerator appliance of claim 10, wherein the elastomeric band is made of silicone rubber.

19. The refrigerator appliance of claim 10, wherein the refrigerator appliance further includes an evaporator.

20. The refrigerator appliance of claim 19, wherein operation of the fan assembly is independent from operation of the evaporator.

\* \* \* \* \*